US009382165B1

(12) United States Patent
Vanderhye

(10) Patent No.: US 9,382,165 B1
(45) Date of Patent: Jul. 5, 2016

(54) WIND TURBINE WITH POLLUTANT CAPTURING SURFACES

(76) Inventor: Robert A. Vanderhye, McLean, VA (US)

( * ) Notice: Subject to any disclaimer, the term of this patent is extended or adjusted under 35 U.S.C. 154(b) by 1721 days.

(21) Appl. No.: 12/068,377

(22) Filed: Feb. 6, 2008

Related U.S. Application Data

(60) Provisional application No. 60/900,704, filed on Feb. 12, 2007.

(51) Int. Cl.
| | |
|---|---|
| F04D 29/38 | (2006.01) |
| C05D 1/00 | (2006.01) |
| C05C 3/00 | (2006.01) |
| C05G 3/00 | (2006.01) |
| F03D 3/00 | (2006.01) |
| F03D 3/06 | (2006.01) |
| F03D 9/00 | (2016.01) |
| F03D 9/02 | (2006.01) |

(Continued)

(52) U.S. Cl.
CPC *C05D 1/00* (2013.01); *B01D 53/62* (2013.01); *B01D 53/78* (2013.01); *C05C 3/00* (2013.01); *C05G 3/0052* (2013.01); *F03D 3/005* (2013.01); *F03D 3/061* (2013.01); *F03D 9/001* (2013.01); *F03D 9/021* (2013.01); *B01D 2251/2062* (2013.01); *B01D 2251/306* (2013.01); *B01D 2251/602* (2013.01); *B01D 2251/604* (2013.01); *B01D 2251/606* (2013.01); *B01D 2257/504* (2013.01); *B01D 2259/4558* (2013.01); *F05B 2240/213* (2013.01); *F05B 2240/301* (2013.01); *Y02C 10/04* (2013.01); *Y02E 10/74* (2013.01); *Y02P 20/151* (2015.11); *Y02P 20/152* (2015.11)

(58) Field of Classification Search
CPC ........... C05D 1/00; F03D 3/005; F03D 3/061; F03D 9/001; F03D 9/021; F05B 2240/231; F05B 2240/301
USPC ................ 415/121.1, 121.2, 4.2; 416/62, 230
See application file for complete search history.

(56) References Cited

U.S. PATENT DOCUMENTS

| | | |
|---|---|---|
| 4,140,602 A | 2/1979 | Lewis et al. |
| 4,254,005 A | 3/1981 | Rowland et al. |
| 4,902,411 A | 2/1990 | Lin |

(Continued)

FOREIGN PATENT DOCUMENTS

DE         10206536 A1    8/2003

OTHER PUBLICATIONS

Cheng et al, "Invesitgation of Carbon Distribution with 14C as Tracer for Carbon Dioxide Sequestration . . . "; Energy Fuels Journal, 2007, #21, Issue 6, pp. 3334-3340, Sep. 18, 2007.
Zhou et al, "A Feasibility Study on a two Stage Benefits CO2 Sequestration Technology . . . "; 1st Annual Conference on carbon sequestration, May 15-17, 2001, Virginia.

(Continued)

*Primary Examiner* — Dwayne J White

(57) ABSTRACT

Greenhouse gases, such as carbon dioxide and methane, or other pollutants, are removed from ambient air while at the same time performing other useful functions. For example, surfaces of a vertical axis wind turbine (such as a Savonius) are provided as, or covered by, fabrics, films, or coatings which remove pollutants from flowing ambient air that contacts the turbine vanes and effects rotation of them to produce electricity. Many different materials may be used, such as activated carbon (especially associated with aramid fabrics), hydroxide coated textiles, hydroxyl ion rich cloth (e. g. wool), or coatings or films of titanium dioxide. After pollutant capture the materials or fabrics may be regenerated, burned with biomass, or disposed of.

3 Claims, 5 Drawing Sheets

(51) Int. Cl.
  *B01D 53/62* (2006.01)
  *B01D 53/78* (2006.01)

(56) References Cited

U.S. PATENT DOCUMENTS

| | | |
|---|---|---|
| 4,919,910 A | 4/1990 | Kurtz et al. |
| 5,061,455 A | 10/1991 | Brose et al. |
| 5,221,520 A | 6/1993 | Cornwell |
| 5,389,350 A | 2/1995 | Freeman et al. |
| 5,390,667 A | 2/1995 | Kumakura et al. |
| 5,584,507 A | 12/1996 | Khandhadia et al. |
| 5,690,099 A | 11/1997 | Abramov et al. |
| 6,200,543 B1 | 3/2001 | Allebach et al. |
| 6,361,582 B1 | 3/2002 | Pinnau et al. |
| 6,447,437 B1 | 9/2002 | Lee et al. |
| 6,565,627 B1 | 5/2003 | Golden et al. |
| 6,660,064 B2 | 12/2003 | Golden et al. |
| 6,733,239 B2 * | 5/2004 | Lee .................. 416/62 |
| 6,890,635 B2 | 5/2005 | Lin et al. |
| 7,115,236 B2 | 10/2006 | Sekiba et al. |
| 7,302,903 B1 | 12/2007 | Behrens |
| 2006/0051274 A1 | 3/2006 | Wright et al. |
| 2006/0153682 A1 * | 7/2006 | Vanderhye et al. ....... 416/197 A |
| 2006/0186562 A1 | 8/2006 | Wright et al. |
| 2006/0289003 A1 | 12/2006 | Lackner et al. |
| 2008/0008588 A1 | 1/2008 | Hartman |

OTHER PUBLICATIONS

"Scrubbing the Skies", The Economist Technology Quarterly, Mar. 7, 2009, pp. 22 & 24.
Behar, "Now you CO2, now you don't", Popular Science, Aug. 2005, pp. 53-58.
Mazzotti et al "Mineral carbonation and industrial uses of carbon dioxide", IPCC Special Report on Carbon dioxide Capture and Storage, Chapter 7, 2005.
Burke et al "Formation of Free Radicals in Chemically Modified Wools by Persulfate Treatment", Textile Research Journal, vol. 38, #9 (1968)[Abst.].
Djeghri et al "Photointeraction of the surface of titanium dioxide . . . "; Faraday Discuss. Chem. Soc., 1974, 185-193 [Abst.].
Molina "Free radical formation in wool fibers treated by low temperature plasma"; Textile research journal, Nov. 2003.
Atwood et al "A crystalline organic substrate absorbs methane under STP conditions", Chem. Commun. 2005, 51 [Abst.].
"Product Line Accomplishment", "Teaching an Old Material New Tricks", PNNL-SA-53232; Jan. 10, 2007.
Park et al; "Effects of . . . powdered activiated carbon on methane removal . . . " Chemosphere, vol. Sep. 4, 2007 [Abst.].
Fancheng et al; Chemisorption of methane; Abstract; admitted prior art.
Dunlop et al; Electron Spin Resonance Studies . . . Keratin & Related Proteins, Photochem Photobiol, vol. 4, Issue 5, p. 88, 1965 [Abst.].

\* cited by examiner

WIND TURBINE WITH POLLUTANT CAPTURING SURFACES

CROSS REFERENCE TO RELATED APPLICATION

This application is based upon Provisional Application No. 60/900,704 filed Feb. 12, 2007, the disclosure of which is hereby incorporated by reference herein.

BACKGROUND AND SUMMARY OF THE INVENTION

It has been considered desirable for many years to be able to effectively remove pollutants from the ambient atmosphere in such a way that they will not re-enter the environment, with a minimum of energy input. This came more to the forefront in early 2007 by the issuance of a report by the United Nations Intergovernmental Panel on Climate Change which concluded—in such a stark manner that even the few remaining skeptics found hard to ignore—that human activity is warming the Earth at a potentially catastrophic rate, and in a manner that may be irreversible unless immediate steps are taken. Shortly thereafter, the Virgin Earth Challenge was initiated. The Virgin Earth Challenge is a competition seeking techniques and equipment to temper or reverse climate change by removing at least a billion tons a year of carbon dioxide (or carbon dioxide equivalent) from the atmosphere.

In the August, 2005 edition of *Popular Science* an article by Michael Behar entitled "How Earth-Scale Engineering Can Save the Planet" looks at six massive scale proposals for dealing with global warming due to carbon dioxide emissions. Some of the six proposals suggest ways to remove carbon dioxide from the atmosphere, but all of the proposals are rated in the article as impractical, too risky, or insufficient.

Carbon dioxide sequestration by burial is one of the proposals. Carbon dioxide is liquefied where it is generated, and injected underground. However there could be serious problems with leakage from any underground storage facility, and the proposal does not assist in removing already existing carbon dioxide form the atmosphere.

Another proposal is to seed parts of the ocean in the Southern Hemisphere with iron to increase algae bloom with the hope that dying plant life will sink to the ocean floor and sequester its carbon content at the bottom of the ocean. This proposal has had many recent skeptics who say—based upon small scale tests—that actually little carbon will sink to the ocean floor. Also, even if effective, the proposal has off-the-chart environmental risks, including the possibility of making the ocean more acidic and killing many desirable species.

Perhaps the most practical of the proposals is that initially presented by Dr. Klaus Lackner in 1999 and sometimes referred to as "Synthetic Trees" or "Wind Scrubbers". Under this proposal, $CO_2$ absorbing material (such as limewater) would be associated with Venetian blind-like slats that are supported by pedestals. As wind blows through the slats, the $CO_2$ in the air is absorbed by CaOH or NaOH, and periodically removed. After removal, the $CO_2$ would be stripped from the absorbing chemical so that the chemical could be reused. Further manifestations of this general concept are shown in Published U S Patent Publications 2006/0051274, 2006/0186562, and 2006/0289003. Major questions that exist with respect to this technology are the practicality and energy efficiency of regenerating the absorbing chemicals after the $CO_2$ absorption, dealing with the removed $CO_2$, and the cost-effectiveness of installing all of the units necessary to have a significant effect on atmospheric $CO_2$ concentration. Also, if not used where there is a clearly prevailing wind, additional energy-intensive and/or expensive equipment must be provided to orient the structure into the wind for maximum efficiency.

One drawback of all of the above proposals is also the fact that they deal with only $CO_2$. While $CO_2$ is the most prevalent greenhouse gas, it is by no means the only one, nor the most damaging per unit volume. Methane ($CH_4$) has about 23 times (per unit volume) the greenhouse effect that $CO_2$ does, and presently contributes at least about 10% of the total greenhouse effect of man-caused emissions.

According to one aspect of the present invention, a method and apparatus are provided which use the general concept of removal of pollutants (including, but not limited to, greenhouse gases such as $CO_2$ and $CH_4$) in disperse form from ambient air in conjunction with already-existing structures, desirably wind turbines. This minimizes the need for structures to be built specifically for pollutant removal, provides the energy necessary to power any aspects of the method or system that require energy, and in general makes better utilization of resources. The apparatus utilized preferably comprises a wind turbine, most desirably a vertical axis wind turbine (VAWT) which makes the direction of the wind irrelevant. While a wide variety of wind turbines could conceivably be used, by far the most practical is a Savonius, such as a classic Savonius, or the type shown in published U S Applications 2006/0153682 or 2007/0212225, or in co-pending utility application Ser. No. 10/854,280 filed May 27, 2004, Ser. No. 11/265,278 filed Nov. 3, 2005, and Ser. No. 11/703,635 filed Feb. 8, 2007 (the disclosures of all of which are hereby incorporated by reference herein).

According to another aspect of the invention, there is provided the general concept of using a fabric substrate for pollution removing materials. While the fabric is desirably used with a wind turbine, that is not a requirement, and the fabric may be used with other equipment as long as it is placed in an outdoor natural substantially ambient air flow path.

Any suitable material may be used which will absorb, react with, and/or otherwise remove carbon dioxide or other pollutants from substantially ambient air (that is at the temperature, humidity, and pressure conditions typically encountered in the atmosphere during normal circumstances). The material may be provided as a wash coat, or attached by tackifier such as an adhesive, to a fabric substrate—or otherwise associated with the fabric. Alternatively, the pollutant-removing material can be sprayed or otherwise applied (in some sort of particle form) to a surface of a vane of a Savonius rotor, either before or after application of adhesive to the surface. After pollutant removal by the removing material, the material may then be washed off the vane surface by applying a high pressure spray which mechanically detaches the material from the surface, and/or by applying a solvent for the adhesive.

According to one aspect of the invention there is provided a wind turbine having a rotating surface. The wind turbine desirably is a VAWT with a substantially vertical surface that includes a pollutant-removing construction or component which removes at least one pollutant from substantially ambient air impacting the surface. A 2-4 vane Savonius wind turbine is preferred.

The VAWT operative surface may include a fabric readily removably covering a main surface of a vane of the VAWT, the fabric having a pollutant-removing material associated therewith. In fact the surface may consist essentially of a fabric having a pollutant-removing material associated therewith (or the fabric may be used in a Dutch four-arm or Portuguese sail windmill).

The pollutant-removing material may be selected from carbon dioxide and/or methane removing materials; and the fabric may be composed of natural and/or synthetic fibers, woven, non-woven, or knit. Providing activated carbon as part of the pollutant-removing material can result in removing both carbon dioxide and methane. That is, a method of removing greenhouse gases may be provided wherein pollutant-removing material including at least some activated carbon, is placed in ambient air flow, and effects substantially simultaneous removal of methane and carbon dioxide.

Alternatively, the pollutant-removing construction or component may comprise a coating or film on the vane surface; or a fabric may have a coating, film, impregnation, integral fiber, or other integral material associated therewith, selected from the group consisting essentially of activated carbon, CaOH, NaOH, magnesium hydroxide, lithium hydroxide, potassium hydroxide, soda lime, magnesium oxide, magnesium hydrooxycarbonate, CaO, calcium carbonate, and combinations thereof. As another embodiment, where a coating or film is provided, the coating or film may be selected from the group consisting essentially of CaOH, NaOH, magnesium hydroxide, lithium hydroxide, potassium hydroxide, soda lime, magnesium oxide, activated carbon particles or fibers, magnesium hydrooxycarbonate, CaO, calcium carbonate, titanium dioxide, and combinations thereof. The coating or film may be held directly on a vane surface by an adhesive.

According to another aspect of the invention, there is provided a method of simultaneously generating electricity and removing at least one pollutant from substantially ambient air by rotating a VAWT in response to ambient wind so that surfaces of the VAWT contact and remove pollutants from the substantially ambient air. The method is preferably practiced so as to remove carbon dioxide and/or methane from substantially ambient air, although other pollutants such as nitrous oxides, carbon monoxide, etc., may be removed. Typically, the VAWT includes vanes having both spill and drive surfaces; and the removal of carbon dioxide and/or methane is accomplished by providing a fabric covering on at least some of the spill surfaces, which fabric has pollutant-removal capabilities. The fabric covering may also be provided on at least some of the drive surfaces. Alternatively, the removal of carbon dioxide and/or methane may be accomplished by providing a coating or film of pollutant removing material on at least some of the spill surfaces The method may further comprise, at spaced intervals of time, reactivating the pollutant-removal capabilities of the surfaces. Also, the method may further comprise, at spaced intervals of time, removing pollutant-removing fabrics from the VAWT, and installing new fabrics on the surfaces. That is, when the surfaces are fabric or fabric coverings capable of capturing pollutants, the method may further comprise periodically removing the pollutant-containing fabrics from the VAWT and replacing them, and using the removed fabrics as geotextile fabrics, as soil conditioners, or for strip mined area reclamation, or by burning them with other biomass to generate space or process heat or electricity, either as is or after shredding.

According to yet another aspect of the invention, there is provided a method of removing a greenhouse gas pollutant (at least one) from substantially ambient air by placing a fabric, that is associated with material operative to remove the greenhouse gas pollutant, in a natural flow of substantially ambient air in an outdoor environment which receives sunlight. The greenhouse gas removed may comprise at least methane, and the method may further comprise, after the fabric is substantially no longer capable of removing methane, burning the fabric with other biomass to produce space or process heat or electricity, either as is or after shredding. Carbon dioxide may alternatively be removed, or substantially simultaneously with methane. That is, the method may be practiced to effect at least methane removal, or to effect at least substantially simultaneous removal of method and carbon dioxide. The fabric is preferably placed in a natural flow of substantially ambient air by providing the fabric as part of a VAWT, although other structures—including those specifically constructed for that purpose—may be utilized. The flowing ambient air can either pass through the fabric, or only partially pass through it, or only substantially impact the fabric with little or no air passing through.

It is a primary object of the present invention to provide a novel manner of removing pollutants, including greenhouse gases, from the environment while at the same time typically performing another function. This and other objects of the invention will become clear from the detailed description of the invention, and from the appended claims.

DETAILED DESCRIPTION OF THE DRAWINGS

Figure 1:
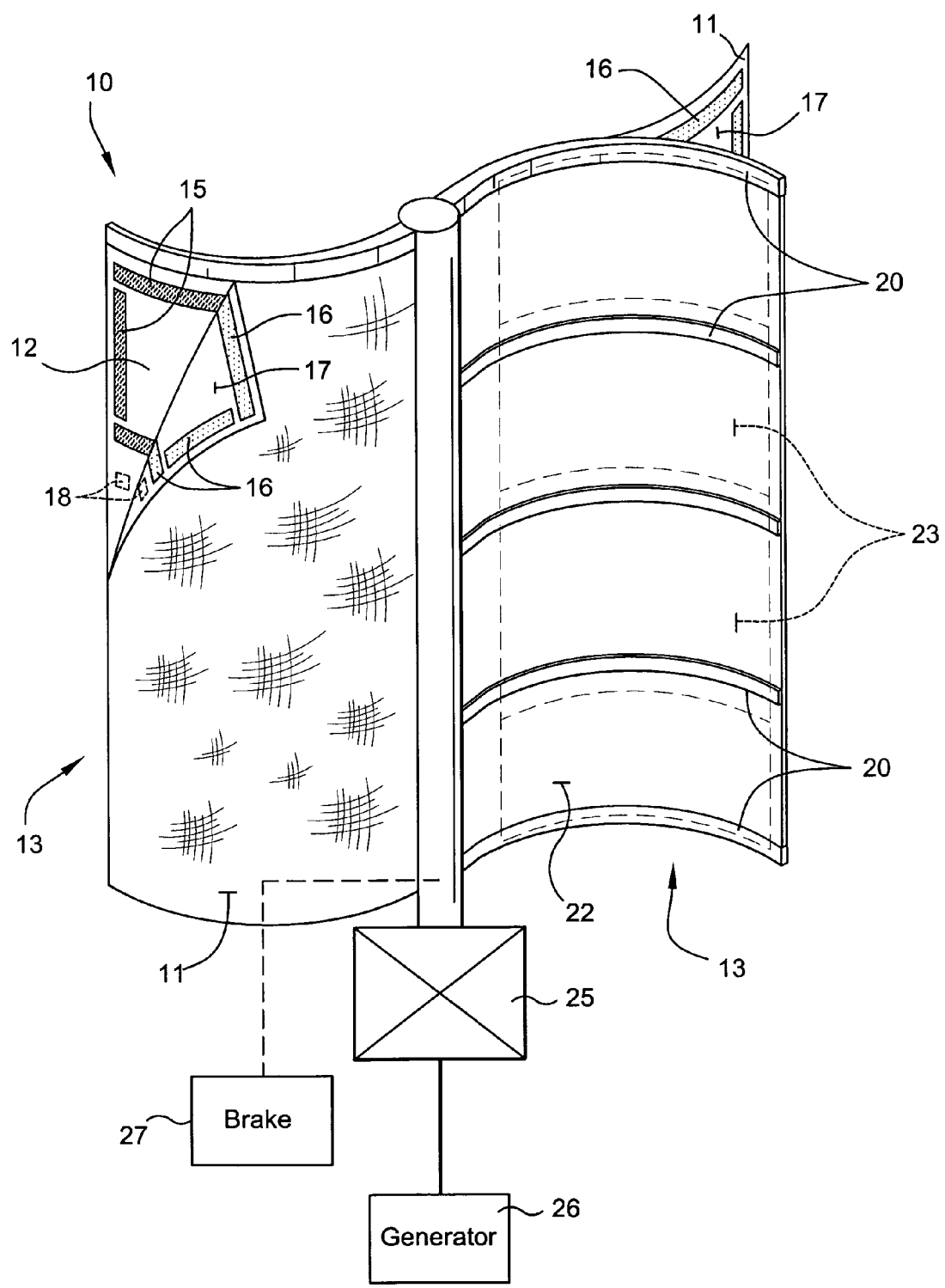
FIG. 1 is a schematic perspective view of one form of a Savonius vertical axis wind turbine (VAWT) rotor that can be utilized to practice the invention.

FIG. 1 is a schematic perspective view of one form of a Savonius vertical axis wind turbine (VAWT) rotor 10 that can be utilized to practice the invention. The rotor 10 is like that illustrated in FIG. 9 of the co-pending application Ser. No. 11/703,635 except that instead of the removable covering for the outer (non-wind-driven, that is the wind-spilling) surfaces thereof simply changing the look and/or surface characteristics of the outer surfaces, the pollutant-removing aspects of the present invention are employed. However, the look changing characteristics described in the Ser. No. 11/703,635 application may still be utilized according to the invention in addition to the pollutant-removing aspects thereof.

The pollutants that are removed may comprise nitrous oxides, CO, or other classic pollutants, or greenhouse gases such as $CH_4$ and $CO_2$.

That is, as illustrated by the exemplary embodiment of FIG. 1, a Savonius rotor 10 according to the invention (in this case a two vane rotor, although the invention is applicable to a Savonius with three, four, or virtually any number of vanes) includes removable coverings 11 for the exterior (wind-spilling) surfaces 12 of the vanes 13 thereof.

The removable coverings 11 are wash coated, impregnated, solution coated, irradiated, plasma treated, chemically acted upon, or otherwise treated so that they have associated therewith particular pollutant-removing chemicals and/or catalysts. Preferably the coverings 11 are some sort of fabric (this term encompassing meshes and non-wovens) which supports the pollutant-removing chemical.

For example the pollutant removing chemical can be CaOH, NaOH, magnesium hydroxide, lithium hydroxide, potassium hydroxide, soda lime, magnesium oxide, magnesium hydrooxycarbonate, CaO, or calcium carbonate, all of which are capable of removing $CO_2$. One brand name material that may be used is SODASORB of W. R. Grace & Co., which is a granulated compound primarily containing hydrated lime (above 80% $Ca(OH)_2$) blended with small amounts of sodium hydroxide (below 4% NaOH).

Alternatively, fibrous activated carbon (see U.S. Pat. No. 5,389,350, incorporated by reference herein) may be used to remove carbon dioxide from air, particularly if the activated carbon is in fabric form, and made by the pyrolysis of aramid fiber fabric. This later embodiment may be particularly advantageous because according to the '350 patent, the $CO_2$-removal functionality of the fabric may be regenerated once the maximum amount of carbon dioxide has been retained.

The regeneration may take place on site (at the VAWT) if proper equipment is available to capture any released components, or at a remote location specifically designed for that purpose to ensure that any released components do not escape. The activated carbon in proper form also can effect removal of $CH_4$, in addition to $CO_2$ [e. g. see U.S. Pat. No. 6,565,627, incorporated by reference herein].

When it is desirable to remove methane from the air, the material used may be a sublimed low density polymorph of p-tert-butylcalix[4]arene [a calixarene]. Alternatively, the material may be any material having a large volume of free radicals, particularly hydroxyl [OH] ions. At present, about 90% of the tropospheric methane that is removed from the atmosphere is removed by the reaction $CH_4+OH \rightarrow CH_3+H_2O$. Methane's major competitor for the hydroxyl radicals is CO, which reacts with the OH ions to produce carbon dioxide and water. Hopcalite, or another material with CO affinity, may be included in the material with a high volume of free radicals, for removing CO.

One particularly advantageous procedure for facilitating methane removal is the use of a plasma or persulfate treated material having a significant amount of keratinous proteins (such as wool fabric, such as knitted marino wool fabric). These treatments of keratinous protein-containing materials result in significant free radical formation. Ultraviolet and other natural [$\lambda$>250 nm] radiation—which of course is a significant component of sunlight—increases the radical concentration, therefore when the material (e. g. wool fabric) is used outdoors—for example as part of a VAWT—the desired effects will increase.

When methane removal from the ambient air is practiced, catalytic materials may be incorporated into the fabric, film, or coating, used to effect methane removal. Almost all transition metals exhibit catalytic activity toward methane decomposition, including Co, Ru, Ni, Rh, Pt, Re, Ir, Pd, Cu, W, Fe and Mo (and combinations thereof, such as Fe+Ni). Depending upon the form of the methane-removing substrate and the particular catalyst used, the manner in which the catalyst is provided will change. In one example, a light wash coat of transition material catalyst may be provided on a textile with otherwise methane-removal properties, or threads or filaments of transition metal may be woven, knit, or otherwise supplied in, the fabric.

While particular techniques are described above, it is to be understood that any suitable technique for effecting free radical rich content of a fabric (particularly hydroxyl radical rich content) now existing or hereafter developed may be utilized, and for any fabric, not just keratinous protein-rich fabric.

Methane, and some other hydrocarbon pollutants, may also be removed from the ambient air using titanium dioxide. For example a titanium dioxide film 40, 42 (see FIG. 5) may be applied directly to the vane surface 12 of a VAWT (see FIG. 1). Enhanced by ultraviolet radiation, the film may photo-oxidize pollutants at ambient temperature into mainly ketones and aldehydes, and/or the chemisoprtion of methane may occur. The vane surfaces 12 that receive the titanium dioxide (whether in film form, granular form, or some other form) may be plastic (e. g. polycarbonate), metal, or fabric.

Figure 5:
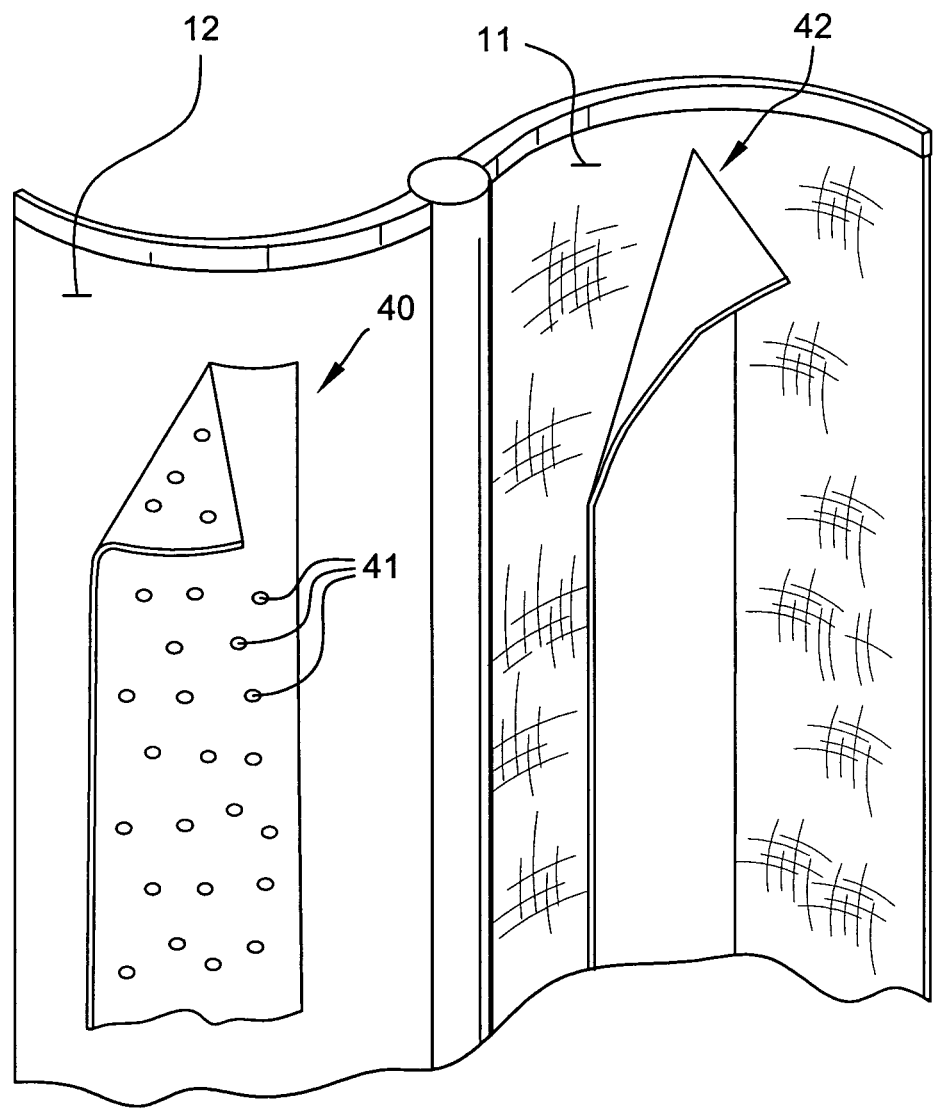
FIG. 5 is a isometric schematic illustration of a film of pollutant-removing material applied directly to a vane surface, or to a fabric covering for the vane surface.

FIG. 5 is a schematic showing of applying a film, desirably of titanium dioxide. On the left of FIG. 5, the film 40 is applied directly to the surface (e. g. of polycarbonate or aluminum) of a vane surface 12. The film 40 may or may not have small perforations or dimples 41 therein. On the right of FIG. 5, a film 42 (which also may have perforations or dimples) is applied on top of at least part of a fabric covering 11 for the vane surface 12, the covering 11 as described above and hereafter.

The material of the coverings 11 themselves may be woven, non-woven, knit, or otherwise constructed, of any desired fibers, organic or inorganic, synthetic or natural. For example a fabric woven from fibers of hemp, flax, jute, cotton, wool, aramid, rayon, polypropylene, polyester, fiberglass, carbon, or combinations thereof (and which may have threads of transition metal), may be wash coated with CaO, FeO, MgO, LiOH, or combinations thereof. Alternatively, a non-woven fabric of any of these fibers may be sprayed with a tackifier coat of adhesive, and calcium carbonate or CaOH may then be applied in granular or pelletized form. In general, the catalyst applying/associating techniques disclosed in U.S. Pat. No. 5,221,520 (incorporated by reference herein) may be utilized.

Any visual design desired may be provided for the coverings, too, as in the Ser. No. 11/703,635 application. This may be accomplished by providing a dye over selected portions of the completed covering, or providing coloring in the initial fabric which still is visible even after the pollutant-removing chemical is associated with the fabric.

The coverings 11 may be made readily detachable from the rotor 10, such as by using cooperating hook and loop (e. g. VELCRO) fasteners 15, 16 on the exterior surface 12 of the vane 13 and the interior surface 17 of the covering 11, respectively. For example the fasteners 15 may be hook fasteners, and the fasteners 16 loop fasteners. Other types of fasteners may also be provided including strips or blocks of magnetic fasteners (shown schematically in dotted line at 18 in FIG. 1), snaps, or the like. The coverings 11 may also at least partially wrap around at least some of the spoke ribs 20 supporting the vanes 13 (see FIGS. 35, 36 & 46 of co-pending U.S. Ser. No. 10/443,954 filed May 23, 2003).

While it is preferred that the coverings 11 be fabric (including mesh), any material capable of being impregnated, coated, or otherwise associated with a pollutant-removal material and fastened onto the rotor 10, may be utilized.

The coverings 11 are shown in FIG. 1 applied to the exterior (wind-spilling rather than wind-driven) surfaces 12 of the rotor 10 because those surfaces will not be as harshly acted upon by the wind as the interior wind-driven surfaces 22. Yet wind will still impact the exterior surfaces 12 at all times that it is blowing. However, instead of, or in addition to, mounting coverings on the exterior surfaces 12, coverings or panels—shown in dotted line at 23 in FIG. 1—may be applied to the interior surfaces 22 of the vanes 13. The coverings/panels 23 may be affixed directly to the ribs 20 by any suitable mechanism (not shown), such as hook and loop fasteners, snaps, magnetic strips, etc.

While the outer coverings 11 illustrated in FIG. 1 are shown as one piece, they may be provided and installed in sections, especially if relatively heavy and/or cumbersome. Four different sections are illustrated for the coverings/panels 23 in FIG. 1.

The rotor 10, which rotates about conventional bearing 25, is operatively connected by shaft 19 (FIGS. 1 and 2) to generator 26 when it is used to generate electricity by driving a conventional generator 26, pump water, or perform some other useful task, such as generating hydrogen. The work performed by the rotor 10 may be utilized on-site (e. g. to run spraying and/or shredding equipment described below), or at a remote location (e. g. the generator 26 may be connected to the grid).

When it is necessary to replace the coverings 11 and/or 23 because their pollutant-removing capability has been substantially exhausted, this is typically done at a low wind time. Nevertheless, a conventional brake 27 is provided to stop rotation of the vanes 13 during the replacement activities. One conventional brake that may be used as the device 27 is a Dexter trailer disc brake K71-651-00 viewable at dexteraxle.com.

When the coverings 11/23 are removed and new ones put in their place, the coverings 11/23 with captured pollutants may be handled in a wide variety of manners depending upon the particular materials utilized, the location of the rotor 10, and the particular pollutants captured. For example, the coverings may be regenerated by techniques appropriate to a particular coating, or the covering may be disassembled for further action. When disassembled, normally the fasteners—such as the loop fastener strips 16—are removed from the coverings 11/23 for reuse, recycling, or separate disposal (particularly if the loop strips 16 are of stainless steel or some other relatively high grade material).

As a first example, if the covering 11 is a fabric of natural fibers (such as wool) and the pollutant captured is methane, the covering 11 may be burned with other biomass for generating electricity. As a second example, if the covering 11 is a fabric of natural fibers and the pollutant captured is carbon dioxide captured with calcium, potassium, lithium, iron, and/or magnesium oxides (which react with the carbon dioxide to produce stable carbonates such as lithium carbonate), the fabric can be used as a geotextile fabric. Alternatively, for soils in need of minerals that are present in the fabric, the fabric can be buried in the soil either whole in some circumstances, or—more desirably—after shredding using conventional shredding equipment. As a third example, if the fabric of covering 11 is of inorganic fibers which captured carbon dioxide, the covering 11 may simply be disposed of in a landfill or as under-burden for reclaiming a strip mined area, since the materials are stable and will not damage the environment.

Figure 2:
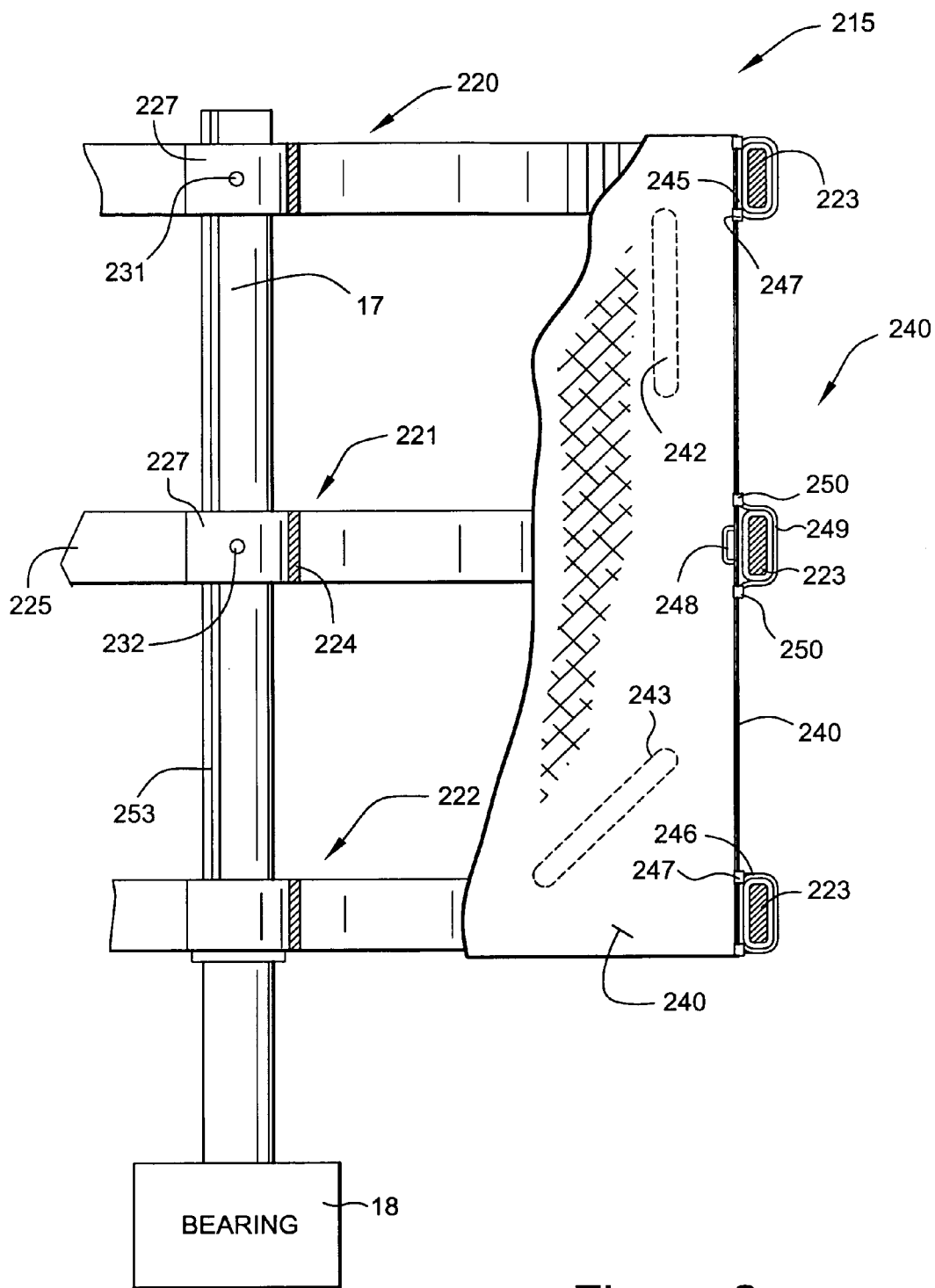
FIG. 2 is a side view, partly in cross-section and partly in elevation, with portions of the vane cut away for clarity of illustration, of another modification of VAWT utilizable in the practice of the invention.

Under some circumstances it may be desirable to make the entire vanes 13 (aside from the ribs 20) of pollutant removing material. For example, the vanes 240 in FIG. 2 are made completely of cloth coated, impregnated, or otherwise associated with, pollutant removing chemicals as described above. The structures and reference numerals designating them in FIG. 2 are the same as in FIGS. 35 and 36 of copending U.S. Ser. No. 10/443,954 filed May 23, 2003 (incorporated by reference herein)—except for the specific cloth of the vanes 240. Another modification—illustrated in FIG. 3—is the same as FIG. 46 of Ser. No. 10/443,954 (the reference numerals and structures the same) except that the cloth of the vanes 303 is cloth like that according to the invention (e. g. associated with magnesium oxide, or an activated carbon aramid).

Figure 3:
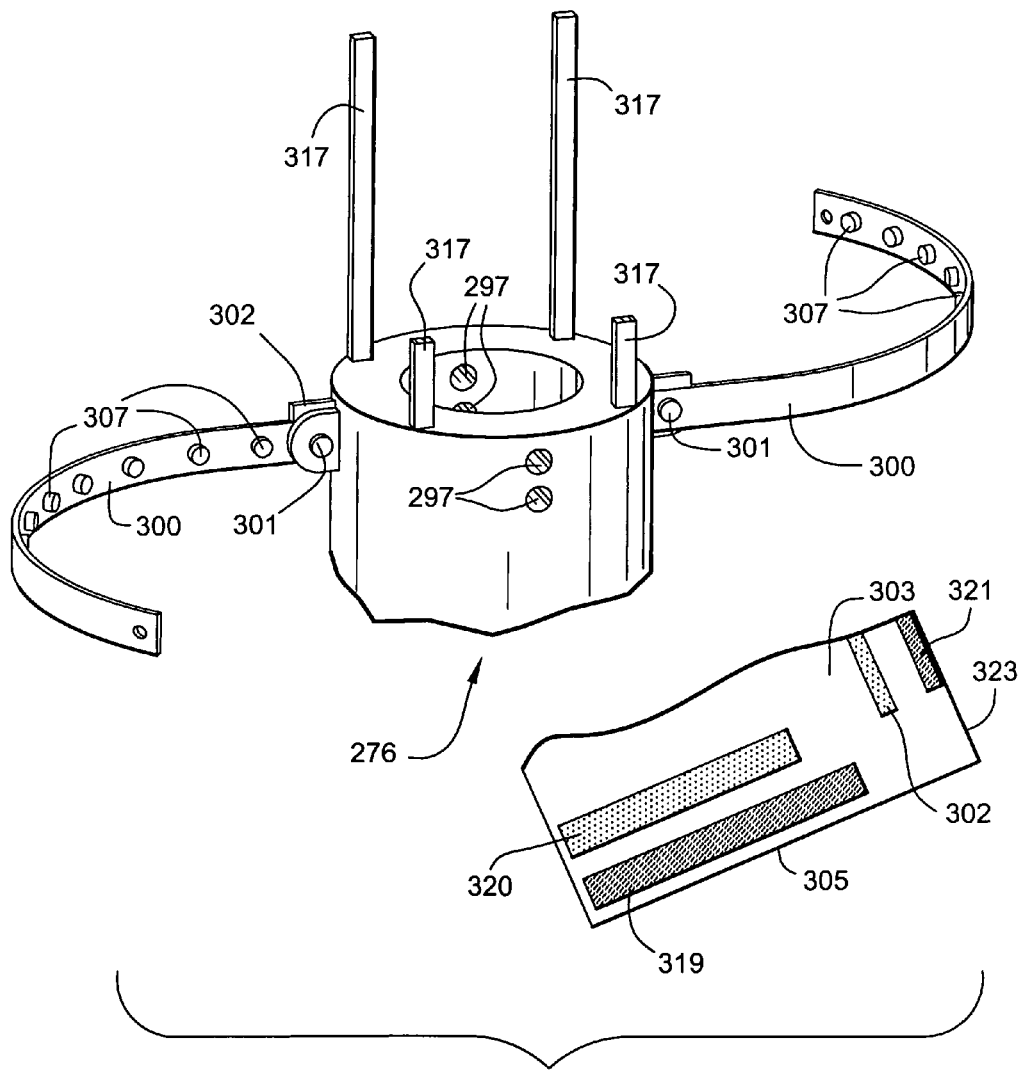
FIG. 3 is a partial perspective view of a VAWT that is the same as FIG. 46 of Ser. No. 10/443,954 only using a textile vane according to the invention.

Where, as in FIGS. 2 & 3, the impregnated fabric is used as the wind driven component of the rotor 10 (that is, substantially the only material of the vanes 240, 303) it typically will have a very tight weave. However under some circumstances, in the practice of the invention, the weave is not quite as tight if the interstices of the fabric include a pollutant-capturing material.

Figure 4:
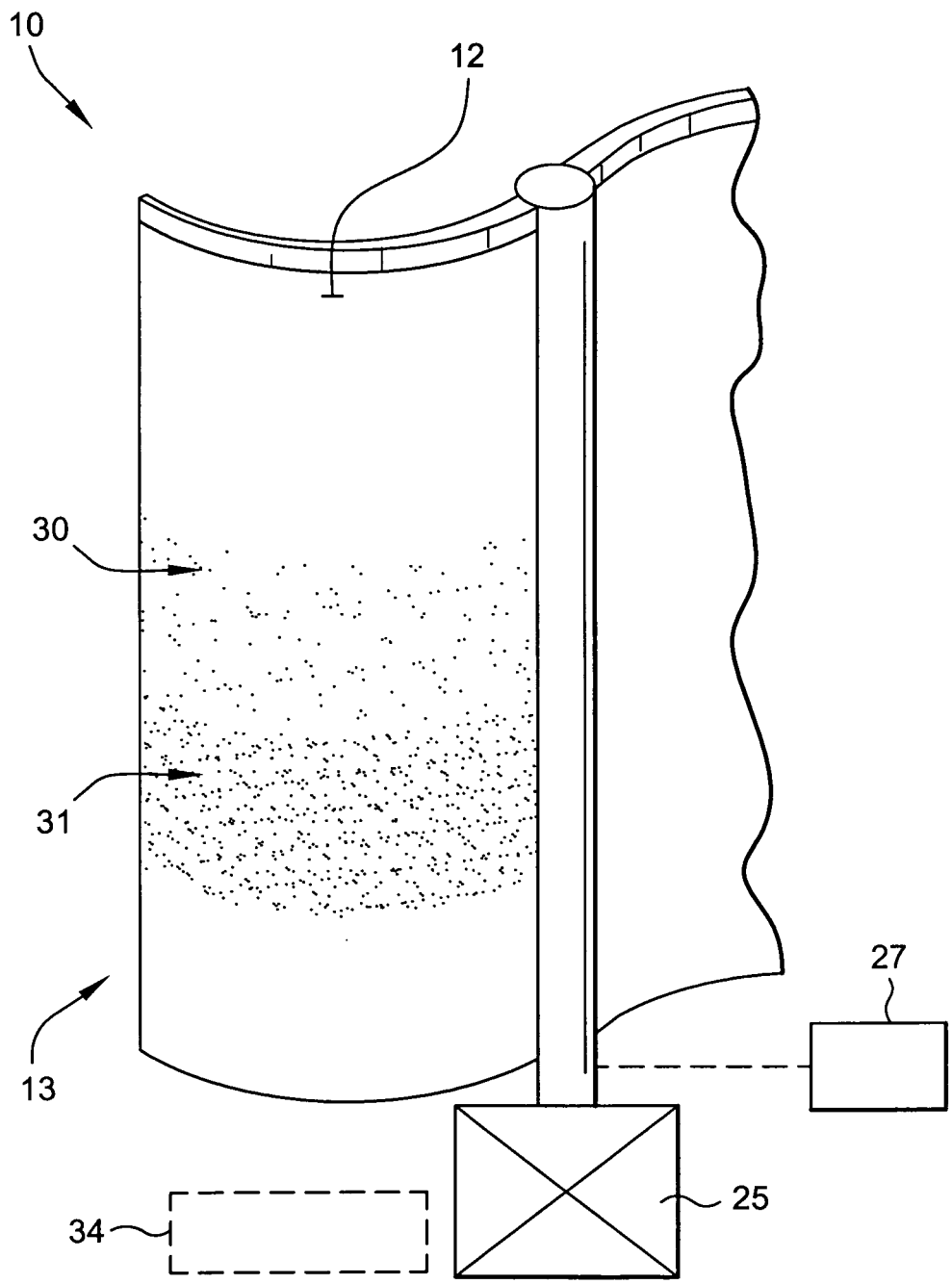
FIG. 4 is a view like that of FIG. 1 only showing a modified form of VAWT according to the invention.

Another modification according to the invention does not use impregnated fabric at all. Rather, the pollution-removing materials are applied directly to the surfaces of the vanes of the wind turbine rotor. For example as seen in FIG. 4 (in which structures the same as those in FIG. 1 are illustrated by the same reference numerals) no covering is provided for the wind-spilling surface 12 of the vane 13. [The surface 12 is typically aluminum, polycarbonate, steel, or other relatively stiff material]. Instead, a conventional adhesive—shown schematically at 30 in FIG. 4—may be first sprayed onto the surface 12. Then, particles of a suitable size, shape, and chemical composition (e. g. medium sized granules of magnesium oxide and/or activated carbon)—shown schematically at 31 in FIG. 4—are applied (e. g. sprayed) onto the adhesive 30.

After operation of the rotor 10 for a period of time sufficient to absorb an optimum amount of $CO_2$, the brake 27 is applied and a liquid which detaches the adhesive 30 and $CO_2$ combined material 31 from the surface 12 is sprayed onto the rotor 10. The mechanical action of the high pressure spray of the liquid may alone be enough to remove most of the material. If necessary, the liquid sprayed on (perhaps after initial action of a high pressure water stream) will be a solvent for the adhesive 30. A tray or tank—shown schematically in dotted line at 34 in FIG. 4—may be positioned to collect the liquid with removed material (typically in slurry form). The slurry in the tray/tank 34, once the removal job (and perhaps waiting until after reapplication too) is completed, is then pumped or otherwise delivered to a tanker truck or the like for ultimate reuse or disposal. For example, assuming the adhesive and sprayed liquid are environmentally benign (or even helpful), the slurry may simply be used as a soil treatment for farm land, or land to be reclaimed from strip mining, or the like.

The surface 12, with the adhesive 30 and particles 31 applied, is typically irregular. If the surface 12—as illustrated in FIG. 4—is the exterior, wind-spilling, surface, then the irregularity of the surface may enhance the rotation of the rotor 10 in response to wind, much as the dimples of golf balls enhance their flight characteristics.

The VAWTs of the invention are particularly practical when placed where the concentration of pollutants desirably removed are great. For example, where methane removal is the primary goal of a VAWT, the VAWT may be placed where methane concentrations are high, such as near a feedlot, certain types of hydrocarbon fuel extraction sources, or landfills without methane recovery equipment. Where carbon dioxide removal is the primary goal, the VAWT (for example one having fabric coverings 11 as according to the U.S. Pat. No. 5,389,350 patent) may be placed in a city or an industrial park, or near a coal burning power plant.

While a Savonius type rotor is preferred according to the invention, the techniques thereof may be applicable to other types of VAWTs not classically considered Savonius turbines, such as open helix turbines, and those in U.S. Pat. Nos. 2,677,344 and 4,359,311, which also have a large surface area, which allows a significant pollutant-removal function. Also, the invention in its broadest concepts is not limited to VAWTs, but can be utilized with some types of horizontal axis wind machines, such as Dutch four-arm, or Portugese sail, windmills.

While the invention has been herein shown and described in what is considered to be the most practical embodiments thereof, it is to be understood that the invention is to be accorded the broadest interpretation possible consistent with the prior art. All narrow ranges within a broad range are specifically included herein.

What is claimed is:

1. A wind turbine comprising: a rotating surface of a vertical axis wind turbine (VAWT) operatively connected to a driven mechanism which performs a useful task; said surface including a pollutant-removing construction or component which removes at least one pollutant from substantially ambient air impacting said surface; wherein said surface includes a fabric readily removably covering a vane of said VAWT, said fabric having a pollutant-removing material associated therewith; and wherein said fabric has a coating, film, impregnation, integral fiber, or other integral material associated therewith selected from the group consistent essentially of CaOH, NaOH, magnesium hydroxide, lithium hydroxide, potassium hydroxide, soda lime, magnesium oxide, magnesium hydrooxycarbonate, CaO, calcium carbonate, and combinations thereof.

2. A method of simultaneously generating electricity, pumping water, or performing some other useful task, and removing at least one pollutant from substantially ambient air comprising:

a) rotating a vertical axis wind turbine (VAWT) in response to ambient wind so that surfaces of the VAWT contact and remove pollutants from the substantially ambient air while the VAWT performs another useful task; wherein the surfaces are fabric or fabric coverings capable of capturing pollutants; and b) periodically removing the pollutant-capturing fabrics from the VAWT and replacing them and using the removed fabrics as geotextile fabrics, as soil conditioners, or for strip mined area reclamation, or by burning them with other biomass to generate space or process heat or electricity, either as is or after shredding.

3. A method of removing a greenhouse gas pollutant from substantially ambient air comprising:

a) placing a fabric, that is associated with material operative to remove the greenhouse gas pollutant, in a natural flow of substantially ambient air in an outdoor environment which receives sunlight; and wherein a) is practiced to remove carbon dioxide by utilizing as the fabric a fabric treated with a material selected from the group consistent essentially of CaOH, NaOH, magnesium hydroxide, lithium hydroxide, potassium hydroxide, soda lime, magnesium oxide, magnesium hydrooxycarbonate, CaO, calcium carbonate, titanium dioxide, and combinations thereof.

* * * * *